United States Patent

[11] 3,544,045

[72] Inventor Robert C. Butscher
     Hawthorne, California
[21] Appl. No. 790,267
[22] Filed Jan. 10, 1969
[45] Patented Dec. 1, 1970
[73] Assignee The Garrett Corporation
     Los Angeles, California
     a corporation of California

[54] THRUST RECOVERY OUTFLOW CONTROL VALVE
     7 Claims, 5 Drawing Figs.
[52] U.S. Cl. .................................................. 244/129,
                                                  98/1.5; 251/212
[51] Int. Cl. ..................................................... B64c 1/14

[50] Field of Search............................................. 98/1.5;
                                              244/117, 118, 129; 251/212

[56]                    References Cited
                  UNITED STATES PATENTS
3,387,804   6/1968   Rhines......................... 98/1.5X
3,426,984   2/1969   Emmons....................... 98/1.5X Primary Examiner—Meyer Perlin
Attorneys—Albert J. Miller and John N. Hazelwood ABSTRACT: A double flapper valve to provide pressure control and thrust recovery from the outflow of a pressurized enclosure.

Patented Dec. 1, 1970

INVENTOR.
ROBERT C. BUTSCHER
BY
Albert J. Miller
ATTORNEY

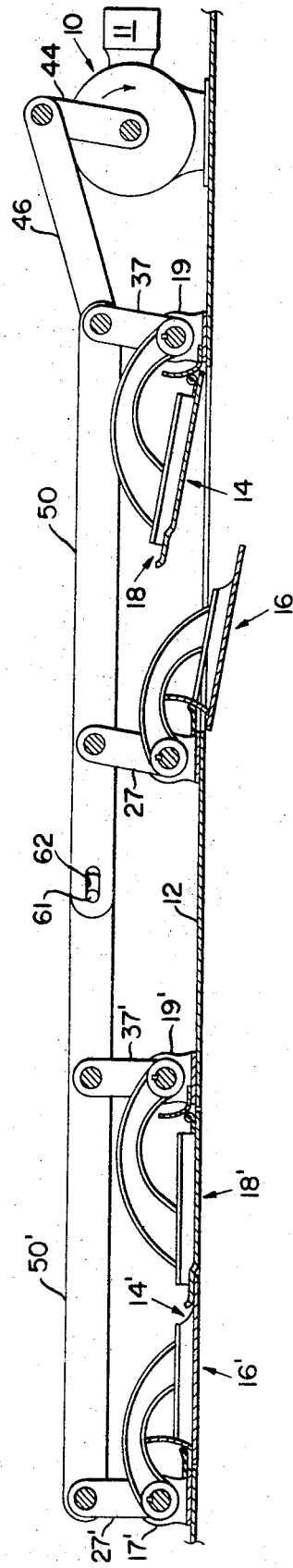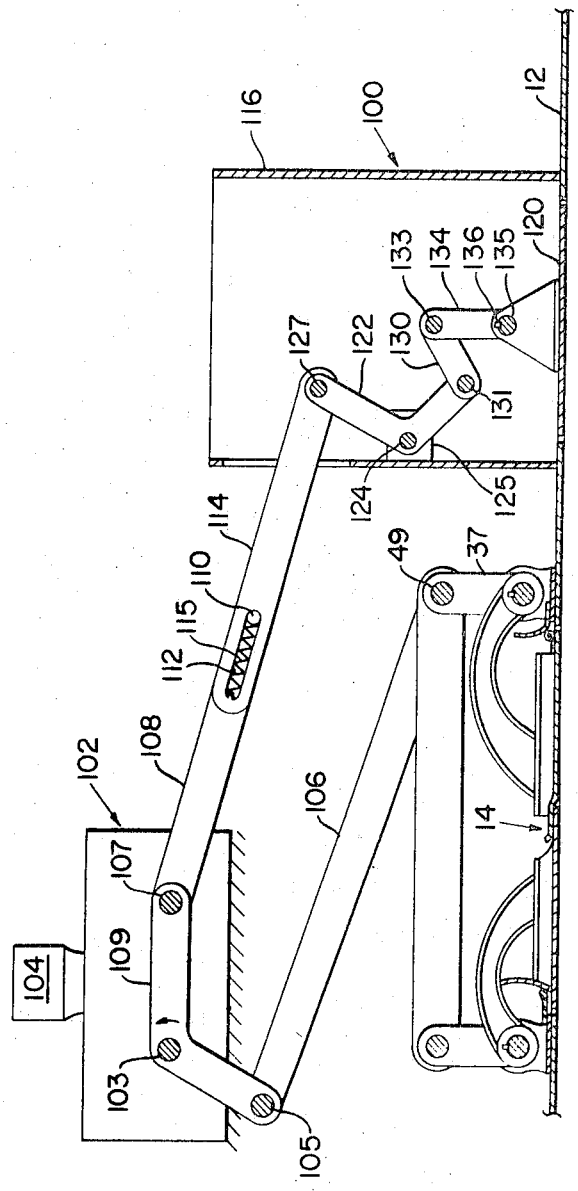
FIG. 3
FIG. 5
INVENTOR.
ROBERT C. BUTSCHER
BY
Albert J. Miller
ATTORNEY 3,544,045

1

THRUST RECOVERY OUTFLOW CONTROL VALVE

BACKGROUND OF THE INVENTION

In pressurizing and ventilating a moving enclosure, an air pump, supercharger, engine bleed air, or the like can be provided for continuously supplying air under pressure to the enclosure, and the air is therein maintained at a preselected pressure by controlling the flow of air through one or more outflow valves disposed in an opening or openings in the enclosure. Pressurized aircraft cabins have utilized such systems for many years. With the advent, however, of longer range aircraft, attention has been directed to the recovery of thrust from these outflow control valves of the pressurized aircraft cabins. Attempts towards this objective with single-acting scoop-type valves have been generally unsatisfactory in that their efficiency and effective area are less than desired.

SUMMARY OF THE INVENTION

This invention comprises a double-flapper outflow control valve for thrust recovery from a moving pressurized enclosure such as an aircraft cabin. The double-flapper valve can be used either singly, in tandem or in a side-by-side configuration and also in combination with a secondary outflow valve or valves. When used in combination, the opening of the individual valves may be slaved together or sequenced to provide maximum thrust recovery benefits.

BRIEF DESCRIPTION OF DRAWINGS

FIG. 3 is a side view of two thrust-recovery double-flapper outflow control valves in tandem.

FIG. 5 is a side view of a thrust-recovery double-flapper outflow control valve in combination with a secondary outflow valve.

DETAILED DESCRIPTION OF THE INVENTION

Figure 1:
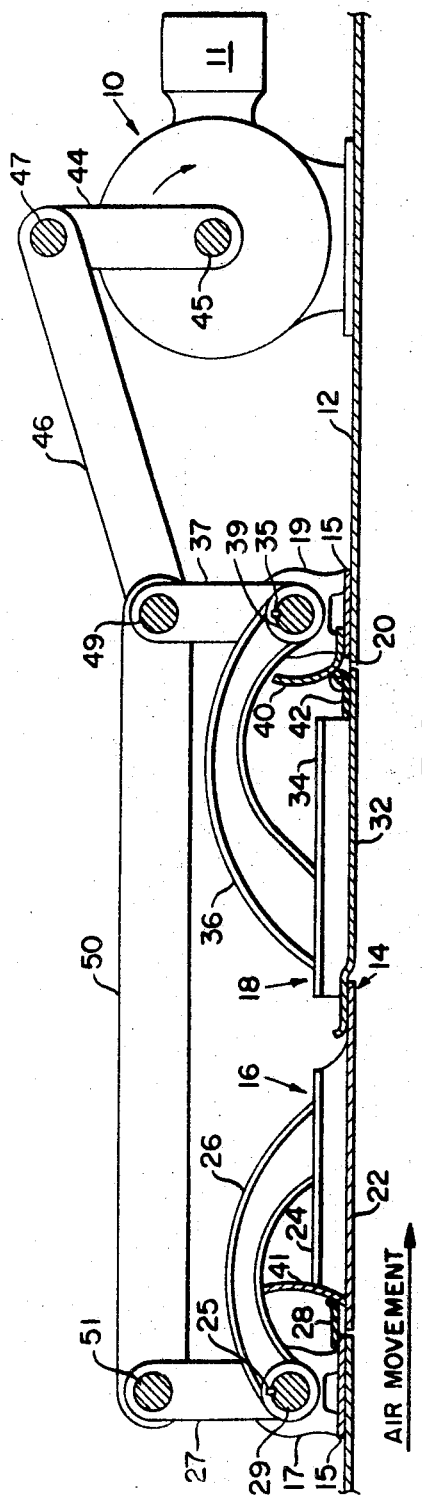
FIG. 1 is a side view of the thrust-recovery double-flapper outflow control valve in a closed position.

A double-flapper outflow control valve for thrust recovery is shown in its closed position in FIG. 1. An actuator 10, mounted on the interior surface of the airplane skin 12, or some other convenient place, provides the driving force for the valve 14. The valve 14 has an outwardly extending flapper 16 and an inwardly extending flapper 18 pivotally hinged on supports 17 and 19, respectively, which are mounted directly on the interior surface of the airplane skin 12 or on a flange 15 around the opening 20 in the airplane skin 12. In their closed positions, the flappers 16 and 18 fully close the opening 20 in the airplane skin 12.

The outwardly extending flapper 16 consists of a flat flapper plate 22 which may be of the same material and thickness as the airplane skin 12. This plate 22 may be reinforced or strengthened by a sheet metal backing 24 connected to a curved support arm 26. Alternately the plate 22, backing 24 and support arm 26 may be cast in a single integral unit for ease of fabrication. The support arm 26 and a lever arm 27 are both fixedly mounted, for example, by means of a key 25, to shaft 29 which is rotatably mounted in the support 17. A curved ram air shield 41 is mounted at the front of the backing 24 and cooperates with a resilient wiper seal 28 mounted at the edge of the opening 20 in the airplane skin 12 to prevent leakage during movement of the flapper 16.

The inwardly extending flapper 18 also comprises a substantially flat flapper plate 32 supported by backing 34 and is adapted to engage the outwardly extending flapper 16. The support arm 36 extending from the backing 34 and lever arm 37 are both fixedly mounted by key 35 to shaft 39 which is rotatably mounted in support 19.

2

A curved ram air shield 40 is provided in the interior of the skin 12 at the opening 20 and communicates with a wiper seal 42 mounted on the plate 32 of the inwardly extending flapper 18 to prevent ram air from entering the interior of the skin during movement of the flapper 18.

An actuator drive link 44 is fixedly mounted at one end to the rotatable shaft 45 of the actuator 10. The other end of the actuator drive link 44 is pivotably mounted to shaft 47 which also pivotably mounts one end of actuator link 46 which extends to the lever arm 37. Shaft 49 pivotably mounts this end of the actuator link 46 and the end of the lever arm 37 in addition to one end of a connecting link 50. The other end of connecting link 50 is pivotably mounted to shaft 51 along with the end of lever arm 27.

Figure 2:
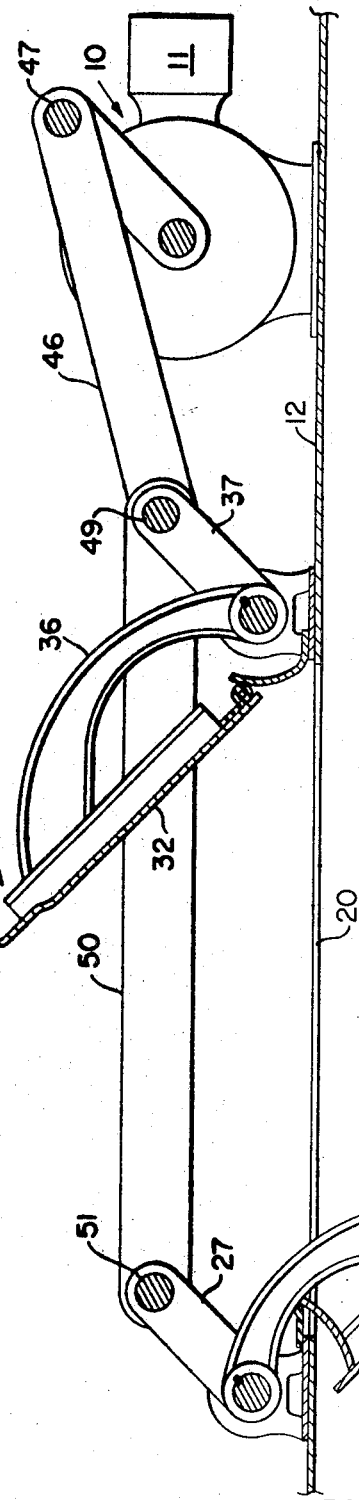
FIG. 2 is a side view of the outflow control valve of FIG. 1 in an open position.

As shown in FIG. 2, rotation of the actuator shaft 45 will accomplish the opening of the flapper valve 14 through the various linkages described above which insure that the flappers 16 and 18 will always operate in concert and remain parallel to each other. Operation of the actuator will normally be in response to a pressure responsive device 11 which can be mounted on the actuator 10 or at some other convenient location within the pressurized enclosure.

As shown in FIG. 3, more than one flapper valve can be operated in tandem from the same actuator. The second flapper valve 14' is substantially identical to the flapper valve 14 illustrated in FIGS. 1 and 2. For tandem operation, connecting link 50 will extend beyond lever arm 27 to lever arm 37' of the second flapper valve. With a direct connection, both valves 14 and 14' will open simultaneously and remain in complete uniformity as to operation. The opening of valve 14' may however be delayed by providing a second connecting link 50' joined to connecting link 50 by means of a pin 61 and slot 62.

Figure 4:
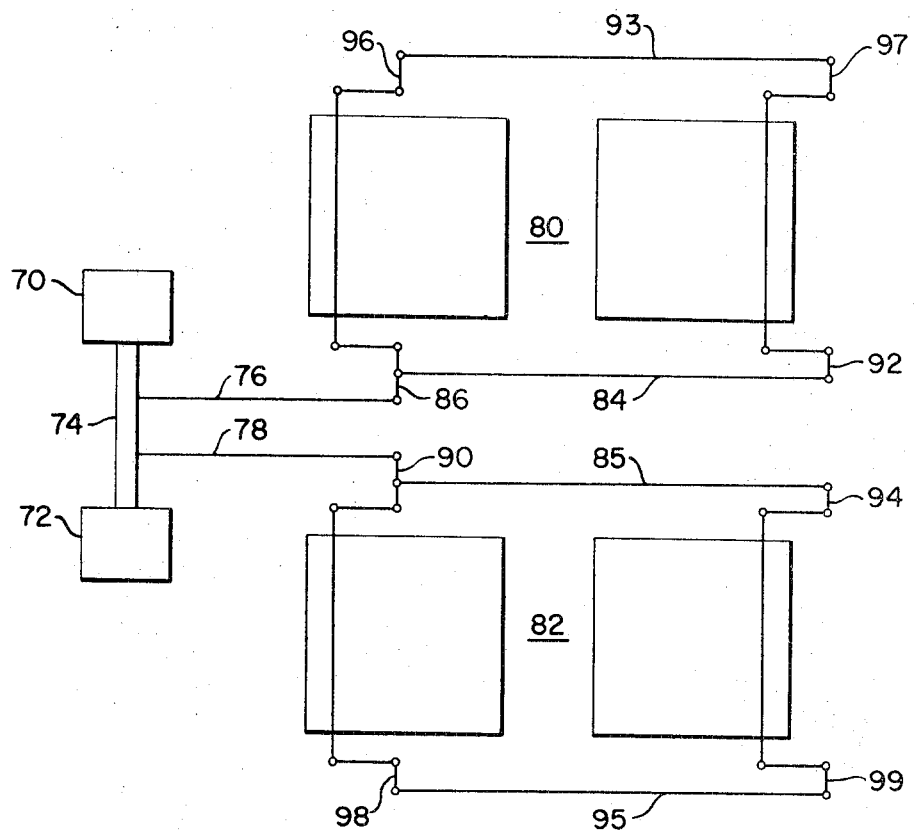
FIG. 4 is a schematic plan view of two side-by-side thrust-recovery double-flapper outflow control valves.

Also, it may be desirable in some circumstances to connect two outflow control valves in a side-by-side arrangement and operate them from the same actuator. A schematic representation of this configuration is shown in FIG. 4. In this situation, as with all the others, an automatic actuator 70 may be utilized in conjunction with a manual actuator 72 both mounted upon a common torque tube 74. Drive link 76 to pivot point 86 will operate flapper valve 80 through actuator link 84. Drive link 78 to pivot point 90 will operate flapper valve 82 through actuator link 85. The opposite ends of actuator links 84 and 85 are mounted at pivots 92 and 94 respectively. Stabilization links 93 and 95 may be provided at the opposite sides of valves 80 and 82 respectively, link 93 mounted between pivots 96 and 97 while link 95 is mounted between pivots 98 and 99.

FIG. 5 illustrates a flapper valve 14 in conjunction with a secondary outflow valve 100 such as a butterfly valve, both operated from the same actuator 102 having a pressure response element 104. An L-shaped lever arm 109 fixedly mounted on the rotatable shaft 103 of the actuator 102, operates the flapper valve 14 by means of an actuator link 106 pivotably mounted between the lever arm 109 and lever arm 37 by shafts 105 and 49 respectively. Shaft 107 pivotably mounts secondary valve actuator link 108 to the lever arm 109 of the actuator 102.

To delay the opening of the secondary valve 100, a pin 110 at the end of the secondary valve actuator link 108 cooperates with a slot 112 in an actuator link extension 114. A spring 116 will bias the link 108 and extension 114 in their normally nonextended position.

The secondary outflow valve 100, principally serving as a dump valve only, comprises a valve casing 116 fitted over an opening 118 in the airplane skin 12. The butterfly 120 positioned at the bottom of the casing 116 normally closes the opening 118. One end of an L-shaped lever arm 122 rotatably mounted on shaft 124 in support 125 mounted on the casing 116 is pivotably connected to the end of link extension 114 by means of shaft 127. The other end of the arm 122 is connected, by shaft 131, to link 130 which in turn is connected to link 134 by shaft 133. The other end of link 134 is fixedly mounted by key 136, to shaft 135 to rotate the butterfly 120.

It should be recognized that the plane about which the butterfly 120 rotates can be shifted 90° to reduce the torque requirement for rotation.

The operation of the flapper valve is quite simple and can provide highly efficient thrust recovery of approximately 90—95 percent at normal cruise speeds. The double flappers will be aerostatically balanced thus reducing the required operating forces (power). The valve will also provide a fence effect from the forward flapper which will prevent the slip stream from disrupting the discharge airflow, thereby resulting in very efficient outflow at high aircraft Mach numbers. Leakage around the flappers is prevented by the ram air shields and wipers. If desired, additional seals can be provided at the side of the flappers and also where the flappers contact each other. Since the forward flapper of the valve extends outward, ram air will maintain the flapper valve in a closed position in the event of linkage failure. The valve provides a large effective flow area per weight of the valve and will not produce any appreciable drag in the closed position since the flapper plates are contoured to the outer surface of the aircraft skin.

I claim:

1. A thrust recovery outflow control valve for a moving, pressurized enclosure having an outlet opening therein, comprising:

a first flapper means pivotably mounted at the forward end of the outlet opening of the enclosure to pivot outward from the enclosure opening, said first flapper means including a first flapper support mounted within the enclosure at the forward end of the outlet opening, a first flapper pivotably mounted on said first flapper support, a first curved ram air shield affixed to the forward end of the first flapper, and a first wiper seal affixed to the forward end of the enclosure opening to cooperate with said first air shield during the outward extension of said first flapper;

a second flapper means pivotably mounted at the rearward end of the outlet opening of the enclosure to pivot inward into the enclosure, said first and said second flapper means normally closing the outlet opening of the enclosure, said second flapper means including a second flapper support mounted within the enclosure at the rearward end of the outlet opening, a second flapper pivotably mounted on said second flapper support, a second curved ram air shield affixed to the rearward end of the enclosure opening, and a second wiper seal affixed to the rearward end of said second flapper to cooperate with said second air shield during the inward extension of said second flapper; and actuator means operably associated with said first and said second flapper means to move in concert said first flapper means outward from said enclosure and said second flapper means inward into said enclosure.

2. The thrust recovery outflow control valve of claim 1 wherein said actuator means includes means responsive to the pressure within the enclosure to control said actuator means.

3. A thrust recovery outflow control valve for a moving pressurized enclosure having an outlet opening therein, comprising:

a valve flange member disposed around the outlet opening in the enclosure;

a first flapper means pivotably mounted to the forward end of said valve flange member to pivot outward from the enclosure, said first flapper means including a first flapper support mounted upon the forward end of said valve flange, a first flapper plate disposed within the outlet opening of the enclosure, and a first lever arm pivotably mounted to said first flapper support and affixed to said first flapper plate to outwardly extend said first flapper plate;

a second flapper means pivotably mounted to the rearward end of said valve flange member to pivot inward into the enclosure, said first and said second flapper means normally closing the outlet opening of the enclosure, said second flapper means including a second flapper support mounted upon the rearward end of said valve flange, a second flapper plate disposed within the outlet opening of the enclosure to cooperate with the first flapper plate of said first flapper means, and a second lever arm pivotably mounted to said second flapper support and affixed to said second flapper plate to inwardly extend said second flapper plate;

actuator means operably associated with said first and said second flapper means to move in concert said first flapper means outward from said enclosure and said second flapper means inward into said enclosure, said actuator means including means responsive to the pressure within the enclosure to control said actuator means;

a first curved ram air shield affixed to the forward end of the first flapper plate;

a first wiper seal affixed to the forward end of said valve flange to cooperate with said first air shield during the outward extension of said first flapper plate;

a second curved ram air shield affixed to the rearward end of said valve flange; and a second wiper seal affixed to the rearward end of the second flapper plate to cooperate with said second air shield during the inward extension of said second flapper plate.

4. A thrust-recovery outflow control system for a moving pressurized enclosure having at least two outlet openings therein, comprising:

a double-flapper thrust-recovery outflow valve mounted in a first outlet opening of the enclosure, said thrust recovery valve including first flapper means pivotably mounted at the forward end of the outlet opening to pivot outward from the enclosure opening and a second flapper means pivotably mounted at the rearward end of the outlet opening to pivot inward into the enclosure, said first and said second flapper means normally closing the outlet opening of the enclosure;

a secondary outflow valve mounted in a second outlet opening of the enclosure, and actuator means operably associated with said double-flapper thrust-recovery outflow valve and said secondary outflow valve to operate said outflow valves, said actuator means including delay means to permit the opening of said thrust-recovery outflow valve before the opening of said secondary outflow valve.

5. The thrust-recovery outflow control system of claim 4 wherein:

said first flapper means includes:
a first flapper support mounted within the enclosure at the forward end of the outlet opening; and
a first flapper pivotably mounted on said first flapper support;

and said second flapper means includes:
a second flapper support mounted within the enclosure at the rearward end of the outlet opening; and
a second flapper pivotably mounted on said second flapper support.

6. The thrust-recovery outflow control system of claim 4 wherein said actuator means additionally includes means responsive to the pressure within the enclosure to control said actuator means.

7. The thrust-recovery outflow control system of claim 4 wherein said double-flapper thrust-recovery outflow valve additionally includes a valve flange member disposed around the first outlet opening in the enclosure.